United States Patent [19]

Yamashita et al.

[11] 4,189,961
[45] Feb. 26, 1980

[54] SPEED REDUCTION MEANS

[76] Inventors: Toshio Yamashita, No. 3-5, Higashi Nihonbashi 2-chome, Chuo-Ku, Tokyo; Hisashi Kaburagi, No. 3-15, Akabanekita 2-chome, Kita-Ku, Tokyo, both of Japan

[21] Appl. No.: 810,962

[22] Filed: Jun. 29, 1977

[51] Int. Cl.² .............................................. F16H 13/08
[52] U.S. Cl. ...................................... 74/798; 74/206
[58] Field of Search .................................. 74/798, 206

[56] References Cited

U.S. PATENT DOCUMENTS

| | | | |
|---|---|---|---|
| 2,536,803 | 1/1951 | Gleason | 74/798 X |
| 3,327,566 | 6/1967 | Hewko | 74/798 |
| 3,375,739 | 4/1968 | Nasvytis | 74/798 |
| 3,955,661 | 5/1976 | Popper et al. | 74/798 X |

OTHER PUBLICATIONS

IBM Technical Disclose, vol. 15, No. 6, Nov. 1972, "Speed Reducer" by J. H. Rhodes, Jr.

*Primary Examiner*—William E. Wayner
*Assistant Examiner*—Harold Joyce
*Attorney, Agent, or Firm*—Michael J. Striker

[57] ABSTRACT

The speed reduction means comprises a stationary hollow cylindrical body supporting for rotation about a common axis coaxially arranged rotary input body and rotary output body. A primary set of power transmitting balls is arranged at regular intervals in two mutually shifted rows forming a zig-zag pattern between the power input rotary body and the power output rotary body. A secondary set of power transmitting balls arranged at regular intervals in a single row is disposed between the power output body and the two rows of balls in the primary set. The bearing surface of the power input body defines an eccentric portion which compresses at one point the primary set of balls in radial direction thus displacing the secondary set of balls in axial direction to meander between the two rows of balls. One of the sets of balls is held in a fixed position by the stationary body and the single row in the secondary set includes n balls and each row in the primary set includes n+1 balls so that a speed reduction ratio of $1/(n+1)$ of the input rotational speed is obtained.

4 Claims, 26 Drawing Figures

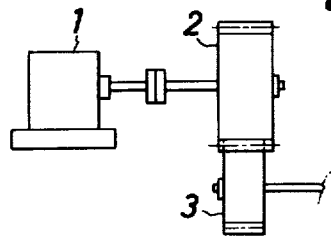
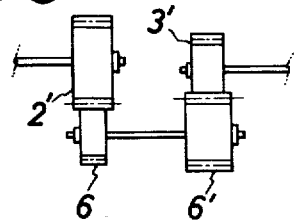
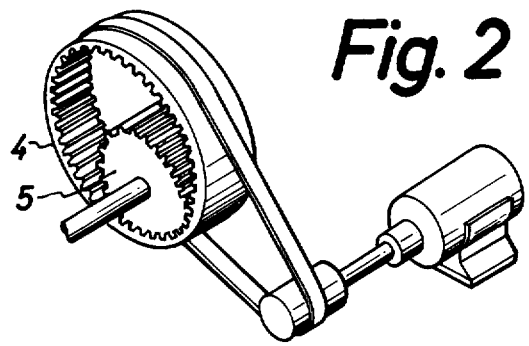
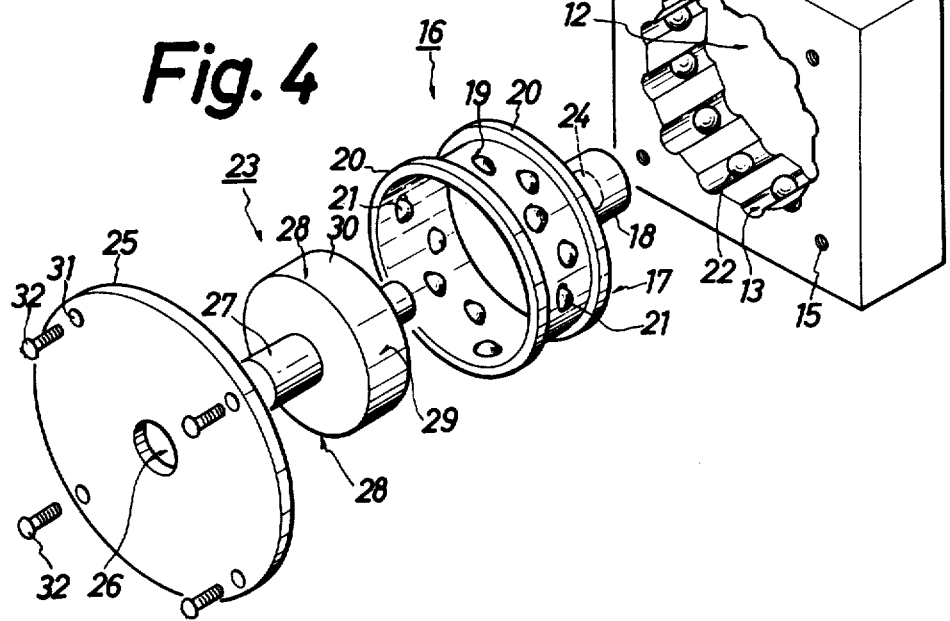

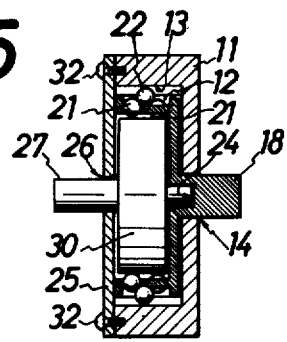
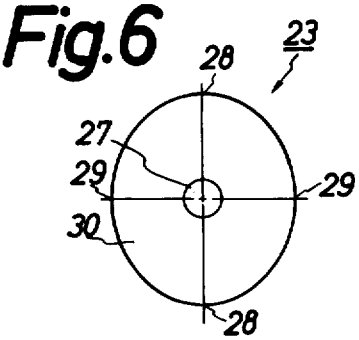
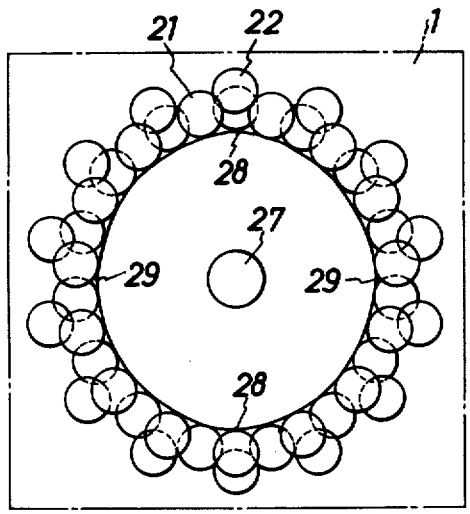
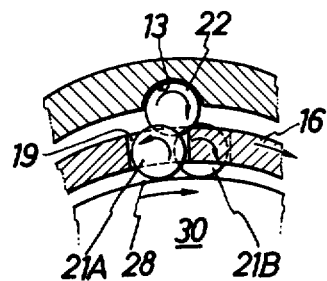
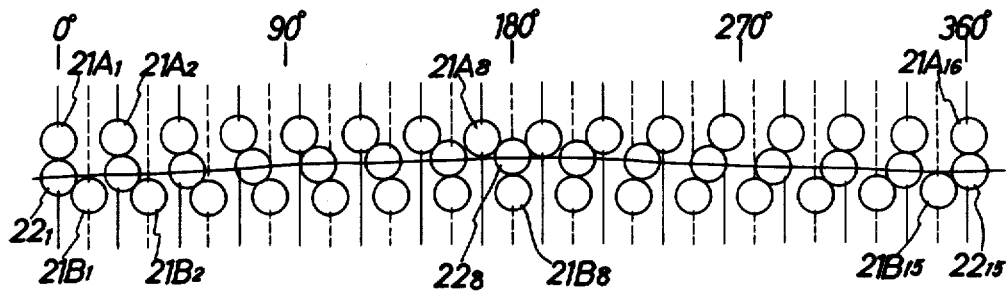

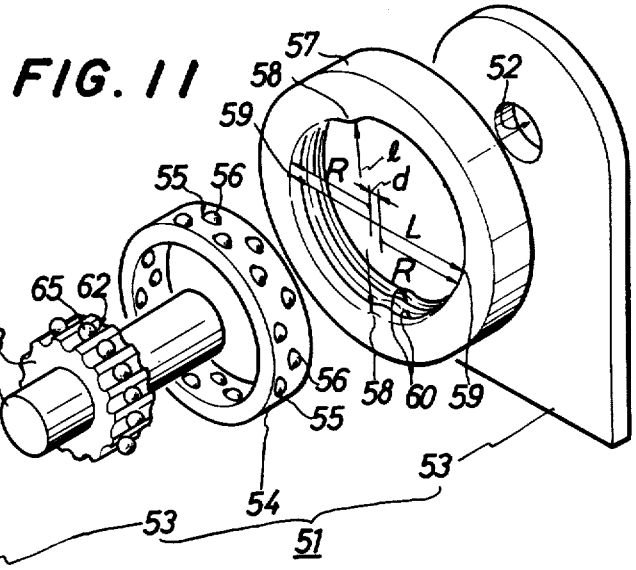
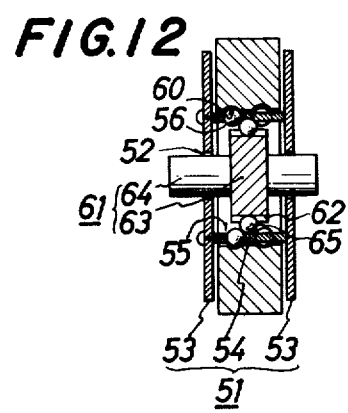
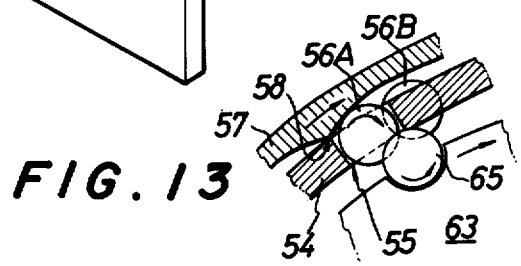
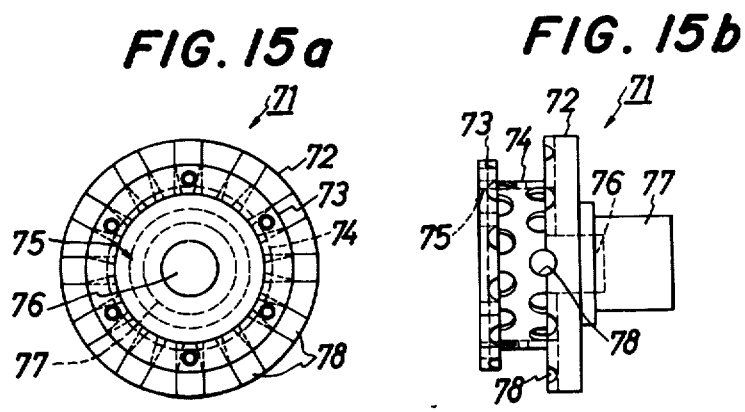

SPEED REDUCTION MEANS

BACKGROUND OF THE INVENTION

A conventional type of speed reduction means is structured as a certain train of gear means. As shown in FIG. 1 a gear means 2 linked to an output shaft of a motor is engaged with a smaller gear means 3 having a smaller number of teeth than that of the gear means 2. It is known that a reduced rotary output can be attained in proportion to the ratio of the number of teeth of the gear means 2 to that of the smaller gear means 3. Further, by mounting a smaller gear means 5 within an annular gear means 4 as shown in FIG. 2, it is known that the ratio of the number of teeth of the gear means 4 to that of the gear means 5 is a reduction gear ratio. Yet, since an input shaft and an output shaft in conventional gear-type speed reduction means are not placed on a coaxial line, it is inconvenient from various points of view to mount such reduction means in a normal power device. To avoid such inconveniences, it has been devised, as shown in FIG. 3, how to position the input shaft and the output shaft on a common coaxial line by means of planet gears 6, 6' engageable with a gear means 2' for input and a gear means 3' for output. Yet the reduction of speed by a multiple stage connection becomes complicated in structure, and the apparatus is oversized, expensive in cost and disadvantageous in durability.

Further, since the point of engagement of the input gear with the output gear, that is, the point of power transmission, is always the same, a very large load is applied to the teeth of gears. Accordingly, for maintaining a high load resistance and a constant rotary speed, a considerable strength and accuracy are necessary. Under these circumstances the manufacturing cost of such prior art reduction gear means becomes expensive.

The object of the present invention is to overcome the aforementioned disadvantages of the conventional art.

SUMMARY OF THE INVENTION

The main object of this invention is to provide a speed reduction means in which a single row of sliding balls including n pieces are rotated about their own axes by the rotation of an input rotary body, while two rows of sliding balls each including n+1 pieces are engaged with or disengaged from the sliding balls the single row and, characterized in that the speed reduction ratio of $1/(n+1)$ of the input rotation is obtained.

Another object of this invention is to provide a speed reduction means in which a rotation power of an input rotary body is transmitted to an output rotary body by means of the above-mentioned sets of sliding balls (n pieces for the primary set and n+1 pieces in the secondary set), characterized in that a control member is provided between an intermediate rotary body and an output rotary body in order to prevent the rotation both of the intermediate rotary body and the output rotary body when a predetermined load is applied thereto, and that the intermediate rotary body is provided with a ratchet means to arrest its rotation in one direction.

Another object of this invention is to provide a speed reduction means wherein an input rotary body and an output rotary body are positioned on a coaxial line without employing planet gears.

Further object of this invention is to provide a speed reduction means wherein while an input rotary body is rotated once, the power transmission from the input continuously occurs at two angular positions of the latter.

These and other objects and advantages of this invention will be more clearly understood from the following description when taken in conjunction with the accompanying drawings.

BRIEF DESCRIPTION OF THE INVENTION

FIGS. 1 to 3 are respective views of a conventional reduction gear means.

FIG. 4 is an exploded perspective view of an embodiment of a speed reduction means according to the present invention.

FIG. 5 is a vertical section view of the speed reduction means in FIG. 4.

FIG. 6 is a front view of an input rotary body in the above embodiment.

FIG. 7 is a plan view showing the arrangment of the steel balls of the primary set and the steel balls of the secondary set in the above embodiment.

FIG. 8 is a view showing the operational function of the main parts in the speed reduction means of FIG. 4.

FIG. 10 is an enlarged view showing a trace of the steel balls in the secondary set and the relationship between the steel balls in the primary set and the steel balls in the secondary set.

FIG. 11 is an exploded perspective view of the second embodiment of a speed reduction means according to the present invention.

FIG. 12 is a vertical section view of the speed reduction means in FIG. 11.

FIG. 13 is a view showing the operational function of the main parts of the above embodiment.

FIG. 15 (a) and 15 (b) are respectively, a front view and a side view of an output rotary body in the third embodiment.

Figure 16A:
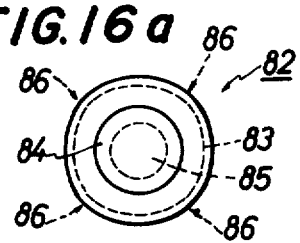
Figure 16B:
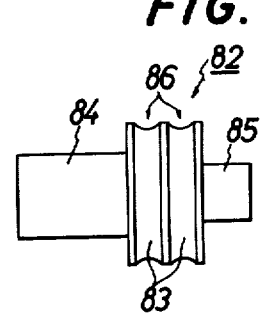

FIGS. 16 (a) and 16 (b) are respectively a front view and a side view of an input rotary body in the third embodiment.

Figure 17A:
Figure 17B:
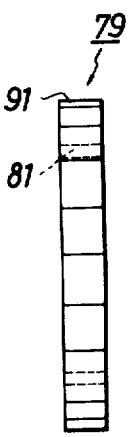

FIG. 17 (a) is a front view and (b) is a side view of the body in FIG. 17a is a front view of an intermediate rotary body in the third embodiment.

Figure 9A:
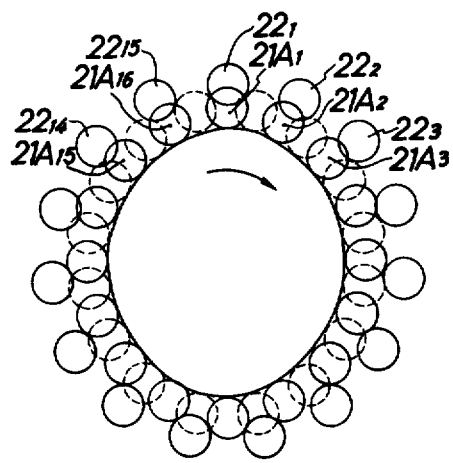
FIGS. 9a through 9f are respective plan views showing relationships between the steel balls in the primary set and the steel balls in the secondary set, and a driving plate in the above embodiment.
Figure 9D:
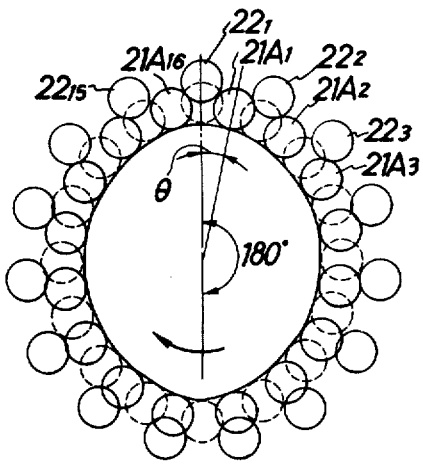
Figure 9B:
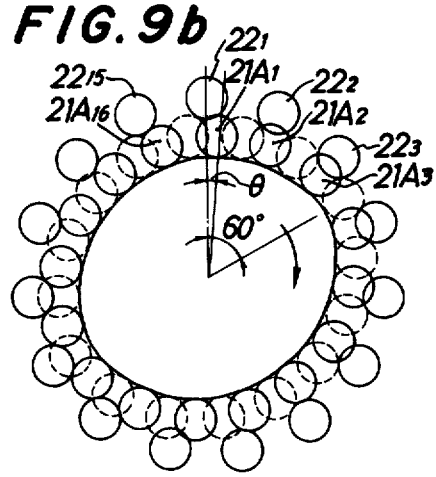
Figure 9E:
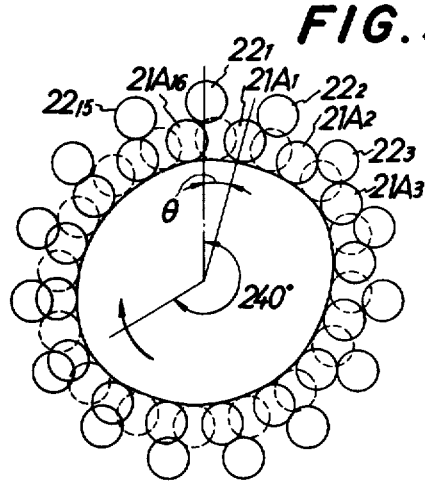
Figure 9C:
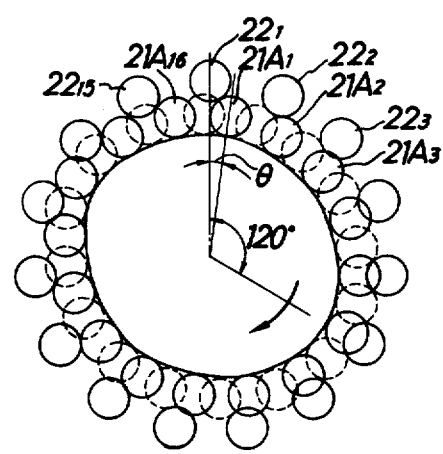
Figure 9F:
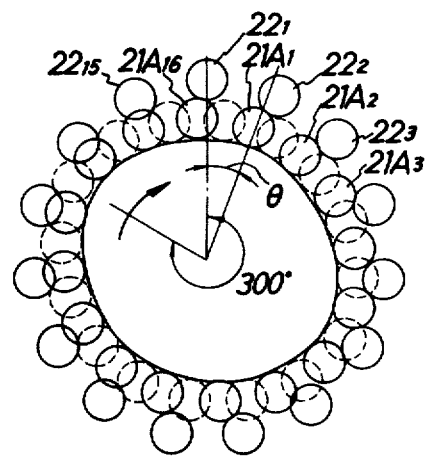
Figure 14:
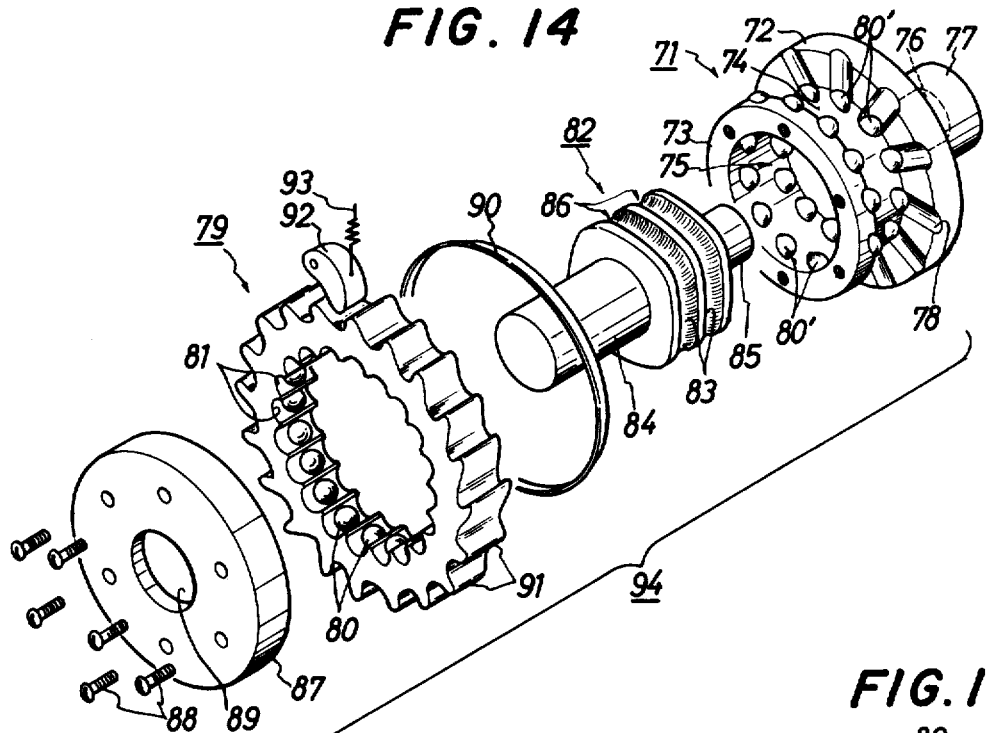
FIG. 14 is an exploded perspective view of the third embodiment of a speed reduction means according to the present invention.
Figure 18:
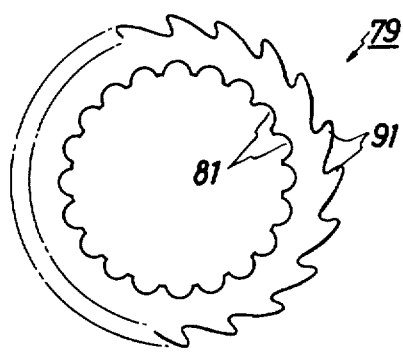

FIG. 18 is a vertical section view of the speed reduction means in FIG. 14.

DETAILED DESCRIPTION OF THE INVENTION

An embodiment of this invention will now be described in reference to FIGS. 4 to 7. Numeral 11 denotes a stationary body having a cylindrical recess 12 of a suitable depth. Fifteen axial grooves 13 of semicircular cross-section are formed in the cylindrical wall of recess 12. Further, in the center of the bottom wall of the recess 12 there is bored a hole 14 and at four corners of the stationary body 11 there are provided four threaded holes 15.

Reference, numeral 16 denotes an output rotary body of hollow cylindrical shape which is capable of being inserted into the recess 12 of the stationary body 11. At the center of base 17 of the output rotary body 16 there is provided an output shaft 18 which can be inserted in the hole 14. Further, in the cylindrical wall of the output rotary body 16 there are perforated thirty-two holes 19 which are regularly distributed about the periphery of the wall in two mutually staggered rows to form a uniform zig-zag pattern. The two side edges of the output rotary body 16 are provided, respectively, with flange 20.

Numeral 21 denotes a steel ball in a primary set of balls, and each steel ball 21 is fitted in each hole 19. Numeral 22 is a steel ball in a secondary set of balls to be fitted for axial displacement in each axial groove 13 of the stationary body 11.

Further, an input rotary body 23 is inserted into the output rotary body 16. A shaft 27 of the input rotary body 23 is rotatably supported at both ends thereof by a shaft-carrying cavity 24 in the output shaft 18 and a center hole 26 of a disc-shaped cover plate 25. As shown in FIG. 6 the input rotary body 23 consists of an oval driving plate 30 having a portion 28 of a larger diameter and a portion 29 of a shorter diameter.

In the corners of cover plate 25 there are perforated four holes 31 to correspond to four holes 15 in stationary body 11. Thus, the cover plate 25 is secured to the stationary body 11 by a plurality of screws.

Upon the insertion of steel balls 21, 22 in the axial grooves 13 of the stationary body 11 as well as in the holes 19 of the output rotary body 16, the output rotary body 16 is inserted in the opening 12 of the stationary body 11, and the input rotary body 23 is inserted in the output rotary body 16. Finally, the cover plate 25 is fixed to the stationary body 11. Then, as shown in FIG. 7, an inside row of the steel balls in the secondary set is engaged with an outside row of the steel balls in the primary set. Further, due to a rotation of the input rotary body 23 and a self-rotation of the steel balls 21 in the primary set as well as of the steel balls 22 in the secondary set, the output rotary body is rotated with a predetermined speed reduction ratio.

The operation of the device of this invention will now be described with reference to FIGS. 8 to 10.

During rotation of input shaft 27 the steel ball 21A in one row of the primary set, the adjoining steel ball 21B in the other row of the same primary set, and the steel ball 22 in the secondary set which is arranged in axial groove 13 of the stationary body 11 are engaged with each other, but at the portion 29 of shorter diameter of the driving plate 30 the space between respective steel balls increases to such an extent that the balls 21A, 21B and 22 are disengaged from each other. On the other hand, at the portion 28 of a long diameter of the driving plate 30 the amount of engagement between respective steel balls is the largest.

Accordingly, by rotating the input shaft 26 in one direction, the driving plate 30 is rotated to the same direction and at the portion 28 of long diameter the steel ball 21A in one row of the primary set, the adjoining steel ball 21B in the other row of the same primary set and the steel ball $22_1$ in the secondary set are engaged with each other. The rotary motion of the steel ball $21A_1$ in the primary set is transferred to the other steel ball $21B_1$ in the primary set, but since at the portion 28 the three steel balls $21A_1$, $21B_1$, and $21_1$ are engaged with each other at maximum, the steel ball $21B_1$ in the primary set is pushed forward. Then, as the steel ball $21B_1$ in the primary set pushes the internal wall of the hole 19 of the output rotary body 16 in the rotating direction of the input shaft 26, the output rotary member 16 is rotated to the same direction.

While causing the steel ball $21B_1$ to turn about its own axis by engaging the steel ball $21B_1$ in a row of the primary set with the portion 28 of long diameter, the output rotary body 6 is rotated by the steel ball $21A_2$ in the other row of the primary set. This is due to the fact that the aforementioned actuation of the adjoining steel ball $21A_2$ in the primary set is effected by means of the steel ball $22_2$ in the secondary set.

In this way, the output rotary body 16 is rotated in the same direction as the driving plate 30, but together with the process of engagement and pushing, disengagement occures at the portion 29 of a shorter diameter. Accordingly, the output rotary body 16 is rotated easily about its axis. In addition, since the process of engagement and pushing and the process of disengagement are constantly carried out at two opposite portions of the circumference of the driving plate 30, force is dispersed, and then a smooth rotation and an efficient transmission can be attained. As shown in FIGS. 9(a) to (f), the angular portion of the output rotary body 16 is varied in proportion to the rotation angle $\theta$ of the driving plate 30.

That is, when the driving plate 30 is rotated at one round ($\theta = 360°$), the steel ball $21A_1$ for the primary section is rotated at 1/16 round. Since the output rotary body 30 is rotated at one round due to 16 rounds of the driving plate 30, as shown in the present embodiment the number of the steel balls in each row of the primary section set of the steel balls is n = 16, while the number of those for the row in the secondary set of the steel balls is n = 16 − 1 = 15. Accordingly, the speed reduction ratio is equal to 1/n = 1/16.

The steel balls 22 for the secondary set are meandering between the staggered steel balls 21An and 21Bn in the primary set.

The trace of the steel ball 22 in the secondary set is of a sine curve of a long pitch as shown in FIG. 10 and its ampltitude (that is, the range of movement of the steel ball 22 in the axial groove 13) is defined by the steel balls 21An, 21Bn for the primary section.

In the present embodiment the input shaft 27 and the output shaft 18 are in alignment with each other, and the speed reduction ratio corresponding to the employed number of the steel balls is attained. Further, power transmission is due dispersed to the two extreme positions. Of the oval driving body 23 and the function of engagement and disengagement is carried out very smoothly due to the mutual rotation of the steel balls.

The second embodiment of the present invention will now be described in reference to FIGS. 11 to 13.

Numeral 51 refers to stationary members which consist of two supporting plates 53 and a circular stationary ring 54. On the circumferential surface of the stationary ring 54 there are perforated a plurality of radial holes 55 arranged in two shifted rows to form a uniform pattern, in each hole being slidably fitted a steel ball 56 of the primary set. According to the present embodiment, the total number of holes 55 is 32, that is, n = 16 holes × 2 rows.

Numeral 57 refers to a movable ring which is a little narrower into width than the stationary ring 54, and in which the stationary ring 54 is ingertable.

The opening of the rotatable ring 57 has an oval shape defined by two semicircles of radius R whose centers of curvature are spaced apart about a fixed distance d. As shown in FIG. 11, the long diameter L is (2R + d). The short diameter l is defined by the distance between two projections 58 for engagement with the balls, while the long diameter L defines the distance between the semicircular inner surface portions 59 serving for disengagement of the balls. Further, along the internal circumferential surface of ring 57 there are provided two grooves 60 of semicircular cross-section in which the upper part of the steel balls 56 of the primary set is inserted.

An output rotary body 61 which has on its cylindrical surface fifteen axial grooves 62 of semicircular cross-section, and a shaft 64 is fixed to the center of the output rotary body 61. A steel ball 65 for the secondary set is slidably fitted in each axial groove 62.

In assembling, after the stationary ring 54 has been inserted in the movable ring 57, a corresponding number of the steel balls 56 for the primary set are inserted in radial holes 55, and subsequently the output rotary body 61 is inserted in the stationary ring 54. Steel balls 65 for the secondary sets are slidably fitted in corresponding axial grooves 62. Finally, the stationary ring 54 is firmly fixed by the two supporting plates 53, 53.

In the speed reduction means as assembled above, when rotating the movable ring 57, the projection 58 on the internal circumference of ring 57 is engaged with the steel ball 56A in the primary set on the stationary ring 54, and then the steel ball 56A is rotated about its own axis.

On the other hand, the steel ball 56A of the primary set, and the adjoining steel ball 56B of the primary set and the steel ball 65 of the secondary set are engaged with each other. Since the steel balls 56A, 56B in the primary set are movable only within the radial hole 55, the steel ball 65 in the secondary set is continuously pushed.

The trace of the steel ball 65 for the secondary set is the same as that of the first embodiment, and each steel ball 65 in the secondary set is disengaged under the condition that it is meandering between the steel balls 56A and 56B for the primary section.

Further, each pushed steel ball 65 in the secondary set is pressing against the surface of the assigned axial groove 62, and the rotary body 63 is rotated in the same direction as the movable ring 57.

While the steel balls 56A, 56B in the primary set are successively engaged with the projection 58 of the movable ring 57, the steel balls 56A, 56B in the primary set and the steel ball 65 in the secondary set are disengaged from each other in the section 59 of the internal circumference of the ring 57. Since this engagement and disengagement is continuously affected at two different positions on the internal circumference of the movable ring 57, a smooth rotation is obtained. The speed reduction ratio of this embodiment is 1/16 that is the same as that of the first embodiment.

Further, the number of eccentrics is at one's option, and shall be decided appropriately in accordance with the number of the steel balls used in a particular application.

The present invention is not limited to the specific two embodiments as mentioned above. It is to be understood that various changes and modifications of the input section, the output section and the stationary section may be made in this invention without departing from the spirit and scope thereof.

In this connection, the third embodiment of the present invention shall be described in reference to FIGS. 14 to 18.

Numeral 71 denotes an output rotary body wherein a disc-shaped base plate 72 and a hollow cylindrical ring 74 having a flange 73 are formed as an integral part. Flange 73 and the ring 74 have a common opening 75. Also, at the bottom wall of the base plate 72 there is provided a support 77 for carrying a shaft 85 in which is formed a hole 76 adjoining to the opening 75. Further, on the external circumferential surface of the ring 74 there are provided sixteen holes 78 of a suitable diameter in and arranged in two shifted rows to form a zig-zag pattern.

Numeral 79 refers to an intermediate rotary body having a central bore the liner diameter of which is a little larger than the external diameter of the flange 73. The intermediate rotary body 79 having ratchet 91 is removably mounted on the external circumference of the ring 74 of the output body 71, and is rotatable by means of the steel balls 80 as mentioned below.

On the internal circumference of the intermediate rotary body 79 there are provided fifteen axial grooves 81 of a semicircular cross-section. The grooves 81 are spaced apart from one another about the same distance as the holes 78. The teeth of ratchet 91 are provided on the external circumference of the intermediate rotary body 79. Each steel ball 80 is slidably fitted in the assigned groove 81 as well as in corresponding hole 78 so that it can be rotated about its own axis. Under the condition that the intermediate rotary body 79 is fitly mounted on the ring 74 of the output rotary body 71, and that the sets of steel balls are fitted in the grooves 81 and the holes 78 as well, the steel balls at the output rotary body 71 (hereinafter called the "steel ball for the secondary set") is engaged with the steel ball 80 at the intermediate rotary body 79 (hereinafter called the "steel ball for the primary set"). The output rotary body 71 and the intermediate output rotary body 79 are rotated with each other due to the transmission of rotation of either one of these bodies.

Numeral 82 denotes an input rotary body having four portions of different diameter to be engaged with or disengaged from the steel balls 80 of the primary set. Further, the input rotary body 82 has an input shaft 84 and a shorter shaft portion 85 to be fitted in a hole 76 in the output shaft 77. On the external circumferential surface of the input rotary body 82 there are provided two parallel grooves 86 of semicircular cross-section.

Numeral 87 refers to a disc-type cover plate adapted to be fixed to the output rotary body 71 by a plurality of screws. The cover plate 87 has an opening 89 in which the input shaft 84 is insertable.

A snap ring 90 exerting a predetermined pressure is provided between the output rotary body 71 and the intermediate output body 79.

During the clockwise rotation of the intermediate rotary body 79, the steel balls 80 in the ratchet 91 are engaged while during an anticlockwise rotation of body 79, a lever 92 locks the ratchet 91. The lever 92 is held in position above the ratchet 91 by means of a spring 93 which is stronger than the snap ring 90, and is interconnected to the output shaft 77. That is, when a given amount of load is applied, the lever 92 is descending against the resilience of the spring 93, and is engaged with one of the teeth of ratchet 91.

According to the speed reduction means of the present invention, after the intermediate rotary body 79 is fitted in the output rotary body 71, the steel balls 80 of the primary set and the steel balls of the secondary set are inserted into the holes 78 and the grooves 81, respectively. Subsequently, the input rotary body 82 is inserted into the intermediate rotary body 79. After the snap ring 90 is installed, the cover plate 87 is finally fixed to the output rotary body 71 by a number of screws 88.

Since the operation of this embodiment is the same as that of the foregoing embodiments, its description will be omitted.

When rotating the output rotary body 71, at the place where steel balls 80' of the secondary sets are engaged with the steel balls 80 of the primary set, even if the steel ball 80' of the secondary set is actuated to push against the steel ball 80 of the primary set the steel ball 80 of the primary set is directed to the center of the intermediate rotary body 79. Since the engaging portion 83 of the input rotary body 82 is the narrowest one, the steel ball 80 of the primary set is immobile.

Therefore, it is impossible to rotate the input rotary body 82 by rotating the output rotary body 71. In other words, this condition is just equal to the condition of braking.

The condition of loading in the third embodiment will now be described in detail.

When the force of loading becomes smaller than the load of the snap ring 20 (or when the lever 92 is separated from the ratchet 91), due to a clockwise rotation of the input rotary body 82 the steel ball 80 of the primary set and the steel ball 80' of the secondary set are engaged with each other. Since the intermediate rotary body 79 is positively connected to the output rotary body 71 due to the action of the spring load of the snap ring 90, no power transmission for causing the rotation of the both steel balls 80, and 80' takes place. As a result, the intermediate rotary body 79 and the output rotary body 71 are rotated with the same rotational speed as that of the input rotary body 82 and in the same direction. Accordingly, the rotation ratio of input to output is 1:1.

When the input rotary body 82 is rotated anticlockwise, the lever 92 is locked in the ratchet 91, and the intermediate rotary body 79 is also locked.

Accordingly, as described above, the output rotary body 71 is rotated anticlockwisely with the speed reduction ratio of 1/16 with respect to the rotation of the input rotary body 82.

Moreover, when a certain given amount of loading is applied, the lever 92 is locked in the ratchet 91, and the output rotary body 71 is rotated against the spring load of the snap ring 90. That is, the intermediate rotary body 79 is in a locked state in which the lever 92 is in engagement with the ratchet 91. Since the output rotary body 71 is rotated with a stronger force than the spring load of the snap ring 90 regardless of the rotation of intermediate rotary body 79, a speed reduction is obtained.

Even if the output rotary body 71 is angularly moved, the steel ball 80 in the primary set and the steel ball 80' in the secondary set lock each other, so that the input rotary body 82 is entirely unmovable.

Accordingly, during a reduced load the input rotary body 82 and the output rotary body 71 are rotated with the ratio 1:1, while at the time of overload a given speed reduction is automatically obtained (or torque is increased).

Further, even if the output rotary body 71 is going to rotate due to overloading or other operation, the steel balls 80, 80' lock each other, so that the input rotary body 82 cannot be rotated. Thus, a high security is obtained.

Further, it is applicable to mount the speed reduction means of the third embodiment to a chain block. When winding up the chain at the time of non-loading or less loading, the input rotary body 82 is rotated, and subsequently, the output rotary body 71 is rotated with the same speed. Accordingly, the chain can be winded up easily in a very smooth operation.

When certain load is applied to the lever 90 which is linked to a hook, the load causes the lever 92 to engage with the ratchet 91, and the intermediate rotary body 79 is locked. Thus, the speed reduction is automatically obtained (torque is increased).

As described previously, a plurality of sliding balls in the primary set and a plurality of sliding balls in the secondary set acting as the medium of power transmission are disposed on an intermediate rotary body and an output rotary body, respectively, and engaged with or disengaged from each other. The output rotary body is rotated by the rotation of the input rotary body, and the intermediate rotary body is controllably locked. Thus, the input shaft and the output shaft are disposed on the same axial line. Further, by controlling the intermediate rotary body at one's option, the rotation ratio of the input rotary body to the output rotary body can be set to be 1:1, or a predetermined speed reduction ratio defined by the number of sliding balls is obtained automatically. Furthermore, in the event an overload, the speed reduction means according to this invention is automatically braked and the rotation of the input rotary body is prevented. As a result, the device of this invention has a high efficiency of speed reduction and a small-sized structure. Still further, this invention can be applied not only in a loading and unloading machine, but also in a power transmission device for automobile or the like. The range of the application is thus very wide.

What is claimed as new and desired to be protected by Letters Patent is set forth in the appended claims:

1. In a speed reduction means, a combination comprising an input rotary body; an output rotary body; a stationary body for supporting said input and output rotary bodies for rotation about a common axis; a primary set of power transmitting balls arranged at regular intervals in two mutually shifted rows forming a zig-zag pattern between said power input rotary body and said power output rotary body; a secondary set of power transmitting balls arranged at regular intervals in a single row between the power output body and said two rows of balls in said primary set; an eccentric portion provided on said power input rotary body for compressing at one point said primary set of balls in radial direction to displace in axial direction said secondary set of balls between said two rows; one of said set of balls being held in a stationary position by said stationary body; and said single row in said secondary set including n balls and each row in said primary set including n+1 balls.

2. The combination as defined in claim 1, wherein said stationary body includes a cylindrical recess defining around its periphery a plurality of uniformly spaced axial grooves; said output body being of a hollow cylindrical shape and defining on its cylindrical surface two rows of mutually shifted holes spaced at regular intervals from each other to form a zig-zag pattern; said secondary set of balls being arranged in said axial grooves and said primary set of balls being arranged in said holes in said output body, and said input rotary body having an oval shape and being disposed in the interior of said output body to compress by its eccentric portion said primary set into engagement with said secondary set.

3. The combination as defined in claim 1, wherein said stationary body includes an intermediate annular body provided with two mutually shifted rows of holes forming regular zig-zag pattern, said primary set of balls being inserted in said holes, said input rotary body surrounding said intermediate annular body and defining opposite said primary set of balls an eccentric endless bearing surface to displace said primary set of balls, said output rotary body being of cylindrical shape and being adapted for insertion into said intermediate stationary body, the cylindrical surface of said output rotary body being provided with a plurality of axial grooves for supporting said secondary set of balls.

4. The combination as defined in claim 1, further including an intermediate rotary body of an annular configuration defining an inner surface provided with a plurality of said axial grooves and an outer surface provided with ratchet teeth; a control member provided between said intermediate rotary body and said output rotary body to prevent the rotation of said intermediate and output rotary bodies when the load applied to said output rotary body exceeds a predetermined limit, and means for arresting said ratchet teeth in one direction of rotation of said intermediate rotary body.

* * * * *